United States Patent
Poling, Jr. et al.

(10) Patent No.: US 7,840,979 B2
(45) Date of Patent: Nov. 23, 2010

(54) GRAPHICAL TILE-BASED EXPANSION CELL GUIDE

(75) Inventors: Daniel L. Poling, Jr., Woodinville, WA (US); Frederic Azera, Kirkland, WA (US); Jeffrey C. Fong, Seattle, WA (US); Michael W. Van Flandern, Seattle, WA (US); Christen Coomer, Seattle, WA (US); John Elsbree, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 642 days.

(21) Appl. No.: 11/821,631

(22) Filed: Jun. 25, 2007

(65) Prior Publication Data
US 2008/0046928 A1    Feb. 21, 2008

Related U.S. Application Data

(63) Continuation-in-part of application No. 11/479,638, filed on Jun. 30, 2006.

(51) Int. Cl.
*G06F 3/00* (2006.01)
*H04N 7/173* (2006.01)
*G06F 13/00* (2006.01)
*G06F 3/048* (2006.01)
*H04N 5/445* (2006.01)
*G06Q 30/00* (2006.01)

(52) U.S. Cl. ............... 725/41; 725/44; 725/51; 725/61; 725/86; 715/788; 715/800; 705/14.4

(58) Field of Classification Search ............ 725/41, 725/44, 51, 61, 86, 87; 715/788, 800, 802, 715/810, 859; 705/14.4, 14.49, 14.73
See application file for complete search history.

(56) References Cited

U.S. PATENT DOCUMENTS

| | | | |
|---|---|---|---|
| 5,592,551 A | | 1/1997 | Lett et al. |
| 5,594,509 A | * | 1/1997 | Florin et al. ............... 725/43 |
| 5,751,282 A | | 5/1998 | Girard et al. |

(Continued)

FOREIGN PATENT DOCUMENTS

KR    10-2002-0028633 A    4/2002

(Continued)

OTHER PUBLICATIONS

"Integrating Broadcast TV with Broadband IP", Synamedia, pp. 1-2.

(Continued)

*Primary Examiner*—Hoang-Vu A Nguyen-Ba

(57) ABSTRACT

A discovery interface facilitates the selection of available media content. Content-relevant graphical tiles are displayed in strips within the discovery interface. In this manner, a user can survey graphics associated with available content. When the discovery interface section (e.g., a row) is in focus, the graphical tiles are expanded as compared to the tiles in sections that are not in focus to provide easier viewing by the user. Furthermore, when an individual tile is in focus, then the tile expands further to be wider and taller than any of the other tiles in the associated tile strip. In one implementation, the focused tile is also highlighted, such as with a distinguishing border. In another implementation, metadata associated with the content of the focused tile is displayed in the proximity of the focused tile.

20 Claims, 9 Drawing Sheets

U.S. PATENT DOCUMENTS

| | | | |
|---|---|---|---|
| 5,901,366 A * | 5/1999 | Nakano et al. | 455/550.1 |
| 5,914,746 A | 6/1999 | Matthews, III et al. | |
| 6,072,983 A | 6/2000 | Klosterman | |
| 6,246,442 B1 | 6/2001 | Harada et al. | |
| 7,051,291 B2 * | 5/2006 | Sciammarella et al. | 715/838 |
| 7,100,185 B2 | 8/2006 | Bennington et al. | |
| 7,117,441 B2 | 10/2006 | Allport | |
| 7,124,424 B2 | 10/2006 | Gordon et al. | |
| 7,174,512 B2 * | 2/2007 | Martin et al. | 715/719 |
| 7,266,832 B2 | 9/2007 | Miller | |
| 7,328,450 B2 * | 2/2008 | Macrae et al. | 725/42 |
| 7,398,541 B2 | 7/2008 | Bennington et al. | |
| 7,421,724 B2 | 9/2008 | Klosterman et al. | |
| 7,581,195 B2 * | 8/2009 | Sciammarella et al. | 715/838 |
| 7,647,332 B2 | 1/2010 | Van Flandern et al. | |
| 2002/0033848 A1 * | 3/2002 | Sciammarella et al. | 345/838 |
| 2002/0087661 A1 | 7/2002 | Matichuk et al. | |
| 2002/0089534 A1 | 7/2002 | Siekmann | |
| 2003/0023975 A1 | 1/2003 | Schrader et al. | |
| 2003/0126607 A1 | 7/2003 | Phillips et al. | |
| 2003/0151621 A1 | 8/2003 | McEvilly et al. | |
| 2004/0040041 A1 | 2/2004 | Crawford | |
| 2004/0139474 A1 | 7/2004 | Carro | |
| 2004/0205816 A1 | 10/2004 | Barrett | |
| 2004/0267611 A1 | 12/2004 | Hoerenz | |
| 2005/0050576 A1 | 3/2005 | Upendran et al. | |
| 2005/0086690 A1 | 4/2005 | Gilfix et al. | |
| 2005/0091111 A1 | 4/2005 | Green et al. | |
| 2005/0160458 A1 | 7/2005 | Baumgartner | |
| 2005/0210391 A1 | 9/2005 | Othmer | |
| 2005/0235321 A1 | 10/2005 | Ahmad-Taylor | |
| 2006/0031875 A1 | 2/2006 | Yu | |
| 2006/0066755 A1 | 3/2006 | Kowald et al. | |
| 2006/0156341 A1 | 7/2006 | Kim | |
| 2006/0236342 A1 | 10/2006 | Kunkel et al. | |
| 2007/0011702 A1 | 1/2007 | Vaysman | |
| 2007/0050446 A1 | 3/2007 | Moore | |
| 2007/0100984 A1 | 5/2007 | Jansky et al. | |
| 2007/0157248 A1 * | 7/2007 | Ellis | 725/47 |
| 2007/0204297 A1 * | 8/2007 | Gonzalez | 725/41 |
| 2007/0204302 A1 * | 8/2007 | Calzone | 725/46 |
| 2007/0234388 A1 * | 10/2007 | King | 725/39 |
| 2007/0240189 A1 | 10/2007 | Paila | |
| 2007/0250863 A1 | 10/2007 | Ferguson | |
| 2007/0266419 A1 | 11/2007 | Kim | |
| 2008/0004960 A1 | 1/2008 | Coomer et al. | |
| 2008/0022310 A1 | 1/2008 | Poling et al. | |
| 2008/0127264 A1 | 5/2008 | Klosterman et al. | |
| 2008/0127281 A1 | 5/2008 | Van Flandern et al. | |
| 2009/0019485 A1 | 1/2009 | Ellis et al. | |
| 2010/0115553 A1 | 5/2010 | Van Flandern et al. | |

FOREIGN PATENT DOCUMENTS

| | | |
|---|---|---|
| KR | 10-2005-0041160 A | 5/2005 |
| KR | 10-2005-0116846 A | 12/2005 |

OTHER PUBLICATIONS

"NagraGuide—Your Subscribers' Personal TV Program Adviser", pp. 1-4.

International Search Report regarding International Application PCT/US2008/066546, dated Nov. 4, 2008.

* cited by examiner

Fig. 2 guide

Thu, Dec 15 | 8:00 PM | 8:30 PM | 9:00 PM | 9:30 PM 1
2 NWCN | Featured Best Bets
3 KWPX | Northwest News | Everything Mag... | Northwest Sports | Everything Mag...
4 KOMO | Diagnosis Murder | Diagnosis Murder

Alias
Fait Accompli
Sydney and APO attempt to discover whom Gordon Dean is working for....
8:00 PM – 9:00 PM Primetime

* ABC On Demand
5 NBC | Joey | Will & Grace | The Apprentice
6 KONG | Dr. Phil | Oprah Winfrey Categories

8:24 PM

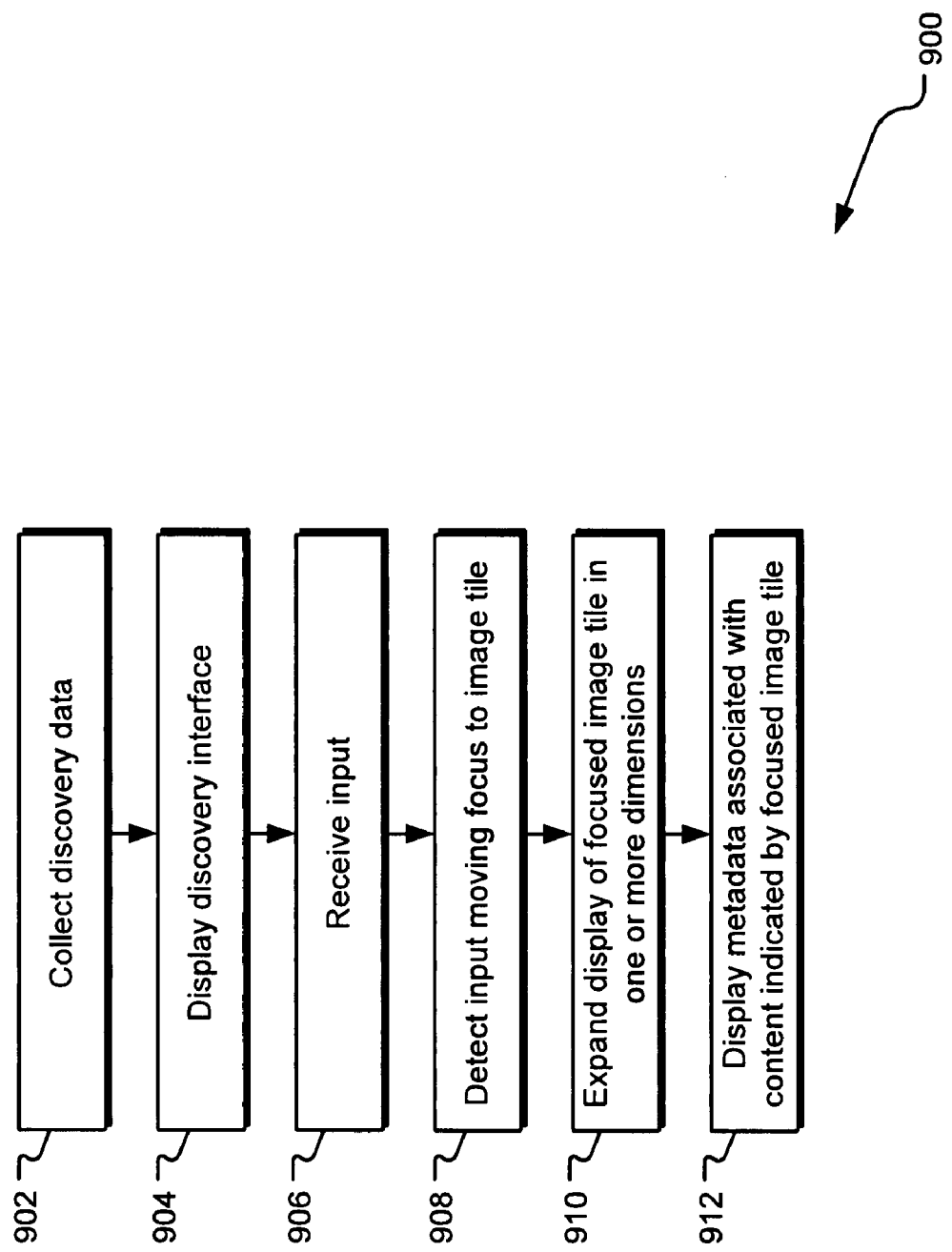

GRAPHICAL TILE-BASED EXPANSION CELL GUIDE

CROSS-REFERENCE TO RELATED APPLICATIONS

This application is a continuation-in-part of U.S. patent application Ser. No. 11/479,638, entitled "Customizing Virtual Channels in a Discovery Interface" and filed on Jun. 30, 2006, which is specifically incorporated herein by reference for all that it discloses and teaches.

BACKGROUND

The convergence of computing and entertainment continues to provide new content and options for consumers. For example, cable subscribers can now access cable television programs and video-on-demand content (VOD) through their set-top boxes. In one offering, video-on-demand service allows a user to select a program for viewing from a library of programs, wherein all of the programs are available at any time and can be paused, saved, reviewed, etc. (as opposed to a cable television program that is only available at a scheduled time and duration). Other sources of content may also exist, including content from a media library, an Internet Protocol (IP) stream, a Web site, etc.

Consumers and content providers can find great benefit in the availability of content from so many different types of sources. For example, a consumer can view a rerun episode of a cable television program and then search for and view a subsequent episode of the same program over VOD or some other content providing channel. For their part, content providers can keep people "tuned in" with a wider assortment of content and content types.

Listings of available programs for a given content source are generated from discovery data (e.g., catalogs of available programming). However, existing approaches for presenting a user with choices of available content from various sources fail to provide a synergistic interface through which to access discovery data for such content. Instead, existing approaches isolate the discovery data for content of each source from the discovery data for content of all other sources. For example, a typical electronic program guide (EPG) provides cable television listings through one interface and video-on-demand content listings through a separate and distinct interface. As such, the discovery interfaces for such content provide no relationships, interactions, or cohesive user experience among content of different sources.

In addition, the amount of available content continues to expand, making it more difficult for a consumer to find the content in which they are interested and make it more difficult for a content provider to maintain the consumer's attention.

SUMMARY

A unified discovery interface allows customized selections of broadcast and non-broadcast media content available within an electronic programming guide. In one implementation, for example, discovery data relating to selected non-broadcast content (e.g., streaming video IP content) is collected (e.g., in a catalog) and presented to a user via a virtual channel together with discovery data related to broadcast content in a discovery interface. In this manner, a user can review available broadcast content and selected non-broadcast content via a unified discovery interface and select either type of content for display in customized virtual channels of the unified discovery interface.

The discovery data relating to the non-broadcast content, for example, may include a discovery interface relationship parameter that allows for customizable association and relationships of the virtual channel within the unified discovery interface. For example, where a virtual channel is associated with a broadcast channel, a row of the discovery interface corresponding to the broadcast channel may indicate that broadcast content from a particular television show episode is available at a given timeslot and then, in an adjacent row corresponding to the virtual channel, other episodes of the same show can be listed as available from an non-broadcast content provider, such as a IP content provider. In this manner, the customizable virtual channel can be selectively presented to the user within the context of listed content from another source, thereby intentionally tying together content of potentially common interest to the user within the unified discovery interface.

Implementations described and claimed herein address the foregoing problems by providing a discovery interface that facilitates the selection of media content, whether the content is broadcast or non-broadcast content. Content-relevant graphical tiles are displayed in strips within the discovery interface. In this manner, a user can survey graphical images, animations, or video associated with available content. When the discovery interface section (e.g., a row) is in focus, the graphical tiles are expanded as compared to the graphical tiles in sections that are not in focus to provide easier viewing by the user. Furthermore, when an individual tile is in focus, then the tile expands further to be wider and taller than any of the other tiles in the associated tile strip. In one implementation, the focused tile is also highlighted, such as with a distinguishing border. In another implementation, metadata associated with the content of the focused tile is displayed in the proximity of the focused tile.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 2 illustrates an example screenshot of a unified discovery interface presenting non-broadcast content in a customized virtual channel of a unified discovery interface.

FIG. 9 illustrates example operations for displaying a discovery interface with an expanded graphical tile for an offering of available media content.

DETAILED DESCRIPTIONS

Figure 1:
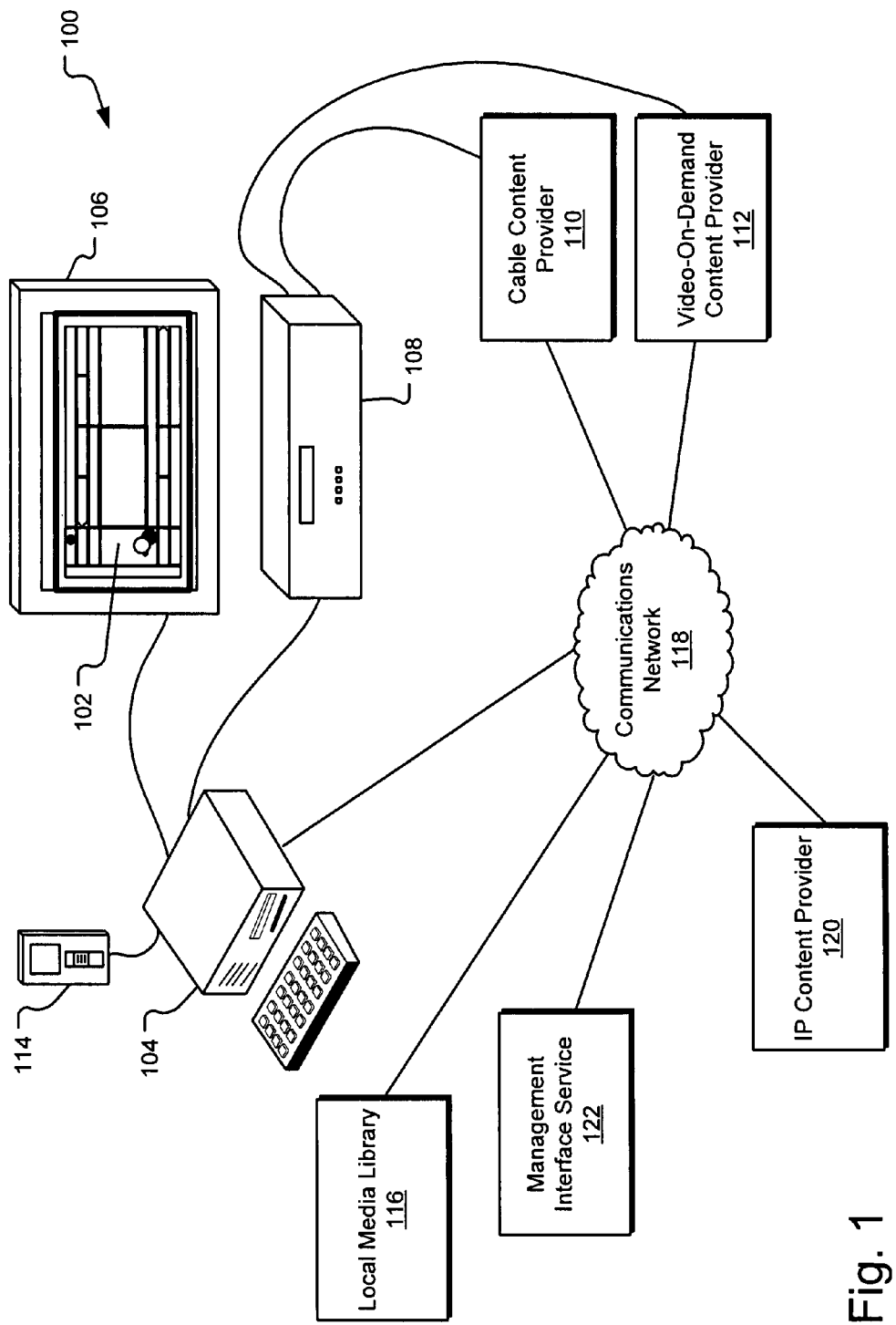
FIG. 1 illustrates an example system for presenting discovery data pertaining to non-broadcast content in a customized virtual channel of a unified discovery interface.

FIG. 1 illustrates an example system 100 for presenting discovery data pertaining to non-broadcast content in a customized virtual channel of a unified discovery interface 102. A user's computing system 104 is coupled to a display device 106, which is capable of presenting the unified discovery interface 102. The computing system 104 is also coupled to a tuner device 108 (e.g., a set-top box or a tuner card internal to the computing device), which communicates with a cable content provider 110 and a video-on-demand content provider 112. It should be understood that the cable content provider 110 and the video-on-demand content provider 112 may be represented by the same entity. Furthermore, content providers that compete with the cable providers, such as satellite services and airwave-based broadcast television stations, may also be supported in a similar manner. Content providers for other media, such as satellite radio, broadcast radio, etc., may also be supported through computing system 104.

In one implementation, the computing system 104 executes a media application that manages the user's access to media content, whether available locally or remotely. For example, the user can use his or her computing system 104 to control a portable media player 114, the tuner device 108, a local media library 116, and other content available from discrete devices or over a communications network 118. Examples of the control a user may apply can include without limitations transferring content between a portable media player 114 and a local media library 116, scheduling the recording of a cable television program by a digital video recorder (not shown) coupled to the computing system 104, downloading IP content (such as a video or song) from an IP content provider 120.

In one implementation, the media application also provides the discovery interface 102 on a display device 106 (e.g., a monitor or television) coupled to the computing device 104. Discovery data is obtained through a media information service 122 that collects program information about content from a variety of sources. The media information service 122 maps data from a variety of sources to one or more consistent schema, enabling a consistent discovery experience, and associates content from different sources. The discovery interface 102 can be represented by an on-screen guide, such as an electronic program guide (EPG), although various monikers may be used in other implementations, including without limitation interactive program guide (IPG) and electronic service guide (ESG). The discovery interface 102 presents an on-screen guide to the available content (e.g., broadcast content, such as scheduled cable television programs, and non-broadcast content, such as available IP content, locally stored media, etc.) in which broadcast content and non-broadcast content are shown together via virtual channels of the unified discovery interface.

In one implementation, the discovery interface 102 provides a graphical user interface that can display program titles and other descriptive information (collectively "discovery data"), such as a summary, actors' names and bios, directors' names and bios, year of production, etc. In one implementation, the information is displayed on a grid with the option to select more information on each program, although other formats are also contemplated. Channel identifiers pertaining to the scheduled cable programs, the program start and end times, genres, thumbnail images, animations, videos, and other descriptive metadata can also be presented within the discovery interface 102. Radio and song information may offer other information, such as artist, album, album cover graphics, and track title information. The discovery interface 102 allows the user to browse program summaries; search by genre, channel, etc.; and obtain immediate access to the selected content, reminders, and parental control functions. If the computing device 104 is so configured or so connected, a discovery interface 102 can provide control for scheduled recording of programs.

A user can use the discovery interface 102 to navigate, select, and discover content by a variety of parameters, including time, title, channel, genre, cost, actors, directors, sources, relationships to other content, etc. Navigation can be accomplished through the media application by a variety of input devices, such as a remote control, a keyboard, and a mouse. In one implementation, for example, the user can navigate through the discovery interface 102 and display information about scheduled cable programs, video-on-demand programs, and associated IP content within a single presentation frame. By navigating through the discovery interface 102, the user can manipulate and obtain more information about a current program or about other programs available through the discovery interface 102. For example, when the computing device 104 is connected to a DVR, the user can to plan his or her viewing schedule, learn about the actors of available programs, and record cable programs to a hard disk in the computer device 104 for later viewing.

FIG. 2 illustrates an example screenshot 200 of a unified discovery interface presenting both broadcast content and non-broadcast content via virtual channels of the unified discovery interface. A grid presentation frame presented in the discovery interface includes rows associated with specific broadcast/cable content providers (e.g., networks, local broadcast stations, etc.) and columns associated with designated time slots. The first column 202 identifies the content provider in a selectable promotional region (see e.g., the promotional region 204). By selecting the promotional region 204, a user can navigate to a promotional frame that provides more information about the content provider's offerings.

In the 8:00 PM-9:00 PM time slot for channel "4", a broadcast content region 206 presents a listing for the program "Alias", with metadata describing the episode title and an episode summary. By selecting the broadcast region 206, the user can gain access to functionality for changing the viewing channel to broadcast channel "4", scheduling a reminder to watch "Alias" at 8:00 PM on Thursday, scheduling a recording of the "Alias" episode, and a variety of other actions. The bold line around the broadcast content region 206 indicates that the user has navigated to the broadcast content region 206.

Figure 3:
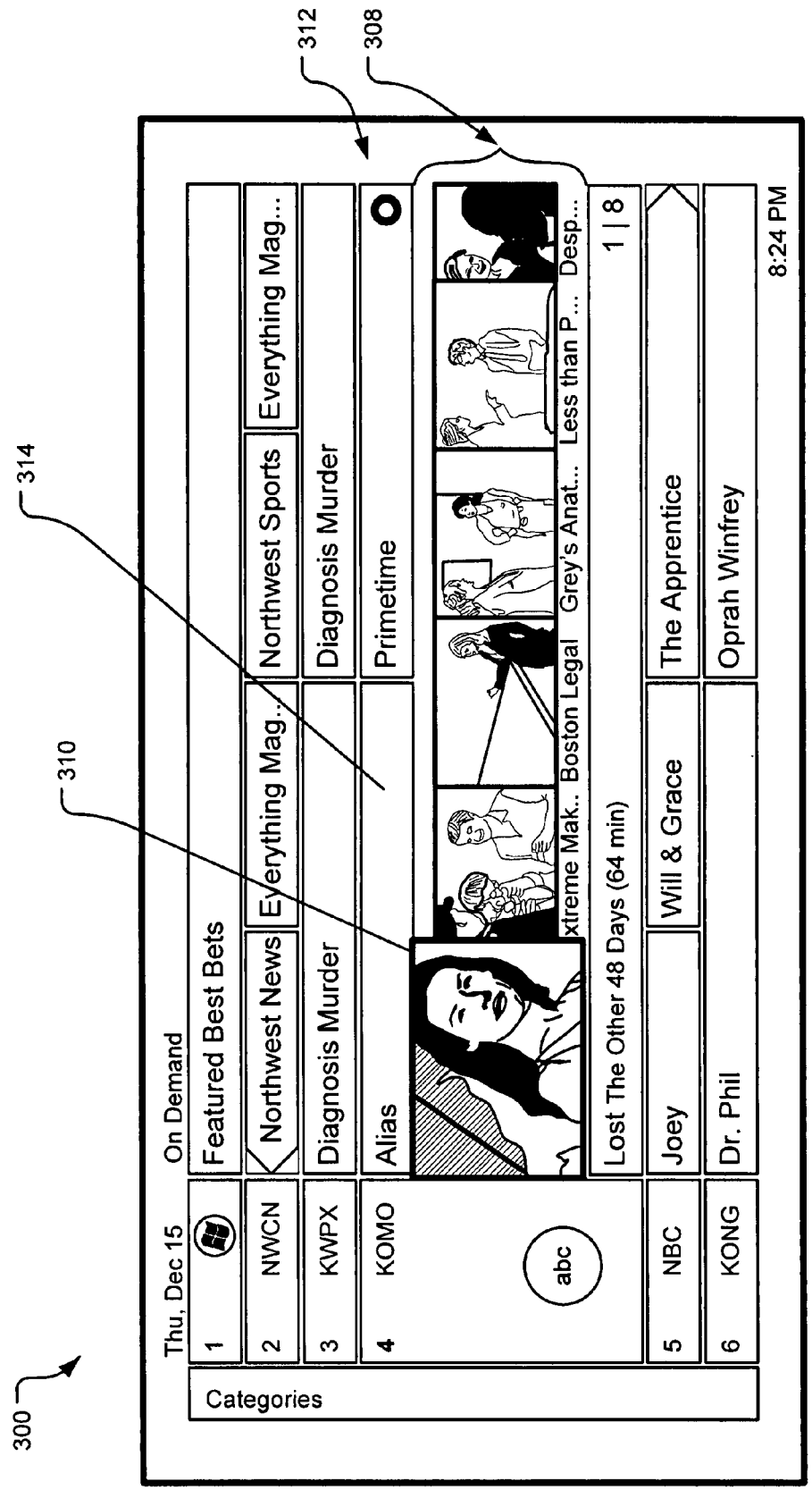
FIG. 3 illustrates another example screenshot of a unified discovery interface presenting non-broadcast content in a customized virtual channel of a unified discovery interface.

A virtual channel region 208 presents non-broadcast content (e.g., IP content). In this implementation, the virtual channel region 208 is associated with the content provider (i.e., ABC) shown in the promotional region 204 and is presented below the broadcast content region 206 (although other implementations are contemplated). By receiving collected catalog metadata relating to broadcast content and non-broadcast content (e.g., IP content) associated with the broadcast content shown in the broadcast region 206, the unified discovery interface can present discovery information pertaining to the broadcast content and the associated non-broadcast content. As shown in FIG. 3, the user can navigate to the non-broadcast content region 208 to gain access to the non-broadcast content associated with the content provider shown in the promotional region 204.

FIG. 3 illustrates another example screenshot 300 of a unified discovery interface presenting broadcast content together with non-broadcast content. For example, a bold line around a non-broadcast content region 308 indicates that a user has navigated to the non-broadcast IP content region 308 associated with the content provider of channel "4," (i.e., ABC channel KOMO). Within the non-broadcast content region 308, the user may navigate between multiple non-broadcast content (e.g., IP content) offerings provided by that content provider (or associated content providers). In the implementation of FIG. 3, for example, a user has navigated to a "Lost" episode 310, called "The Other 48 Days", that is available as IP content within the non-broadcast content region 308. Other options shown in FIG. 3 for the same content provider include "Extreme Makeover," Boston Legal," Grey's Anatomy," "Less than Perfect," and "Desperate Housewives," although other IP content may also be available (e.g., from navigating further right or left within the non-broadcast content region 308.

The offerings presented in the non-broadcast content region 308 can be selected by a discovery data ingestion module (see e.g., the discussion regarding FIG. 4) within the context of the associated broadcast channel region 312. For example, if the user navigated from the Alias panel 314 into the non-broadcast content region 308, the offerings listed in the non-broadcast content region 308 can be selected for display based on the user's previous position on the Alias panel 314 (e.g., based on their popularity among people who watch Alias). In alternative implementations, the offerings listed in the non-broadcast content region 308 may be dependent on other information, including appropriateness to the time slot of the user's previous position (e.g., in relation to parental ratings), compliance with parental controls set on the computing system, paid-for/sponsored-positioning within the non-broadcast content region 308, etc.

Figure 4:
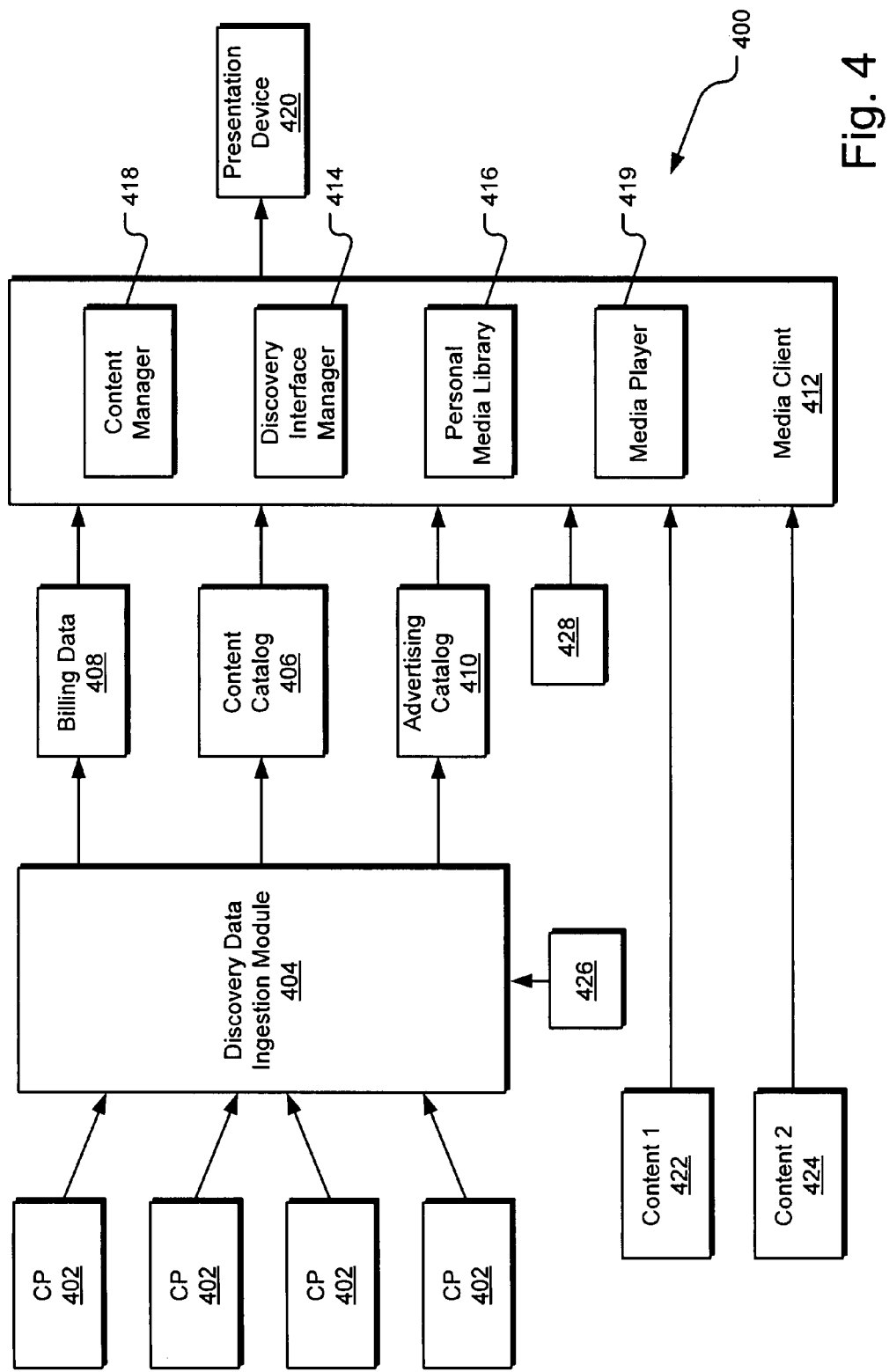
FIG. 4 illustrates an example implementation of a system for providing a unified discovery interface.

FIG. 4 shows an example implementation of a system 400 for providing a unified discovery interface. In this implementation, one or more content providers 402 provide discovery data to a discovery data ingestion module 404. The discovery data ingestion module 404 aggregates the discovery data into one or more content compilations, such as a content catalog 406. For example, broadcast content providers, such as cable television providers, provide discovery data specifying broadcast programming details available for electronic programming guides. Likewise, discovery data for available non-broadcast content can be collected into catalogs using web crawlers, search engines, predetermined offerings catalogs, etc. Such discovery data can then be combined into a content catalog 406 for display and activation within the unified discovery interface.

Discovery data related to non-broadcast content received at the discovery data ingestion module 404 can be associated with one or more virtual channel to be presented in the discovery interface. Thus, if a content provider offers non-broadcast content for a particular virtual channel, the content provider may provide discovery data to the discovery data ingestion module 404 that is linked or otherwise associated with that virtual channel. In one particular implementation, for example, the content provider may link or otherwise associate discovery data for non-broadcast content to a particular virtual channel. In this implementation, for example, the content provider may offer a virtual channel directly to its subscribers and provide discovery data for content offered on that virtual channel to the discovery data ingestion module 404 that is linked or otherwise associated with that virtual channel for presentation in the discovery interface.

The virtual channel offered by the content provider may also be associated with another channel (e.g., a broadcast channel or another virtual channel) available through the discovery interface. In this implementation, the discovery data for content to be offered via that virtual channel may include a discovery interface relationship parameter that identifies a relationship of non-broadcast content offered via that virtual channel to the other channel presented via the discovery interface. In the implementation shown in FIG. 3, for example, the non-broadcast content (e.g., the Lost episode 310 entitled "The Other 48 Days") shown in non-broadcast content region 308 is associated with the ABC content provided via ABC channel "4" KOMO. Thus, the discovery interface relationship parameter associated with this non-broadcast content may identify that the discovery data for this content is to be displayed in association with the broadcast content shown in broadcast content region 312 (e.g., below broadcast content region 312 as shown in FIG. 3).

Alternatively, the discovery data of the non-broadcast content to be presented via a virtual channel in the discovery interface may identify a particular virtual channel it is associated with, and the virtual channel itself may include discovery data or some other parameter identifying the relationship of the virtual channel to some other channel (broadcast or non-broadcast) presented in the discovery interface. In the implementation shown in FIG. 3, for example, a virtual channel (e.g., non-broadcast region 308) is linked with or otherwise associated with the ABC broadcast channel provided in broadcast content region 312 for ABC channel "4" KOMO. In this implementation, discovery data or another parameter of the virtual channel itself may identify that the virtual channel is to be displayed in association with the broadcast channel provided in broadcast content region 312 (e.g., below broadcast content region 312 as shown in FIG. 3).

Where the virtual channel or the non-broadcast content is not associated with a broadcast channel to be presented in the discovery interface, the content provider may provide discovery data for the virtual channel or the non-broadcast content may include a discovery interface relationship parameter that identifies a location (absolute or relative) within the discovery interface for which the discovery data is to be displayed. The discovery interface parameter may identify, for example, a channel number or another location within the discovery interface at which the virtual channel or the non-broadcast content may be presented to a user.

In yet another implementation, the discovery data ingestion module 404 may associate discovery content of non-broadcast content provided by the content providers with one or more virtual channel, either directly or via a discovery data customization interface 426. In this implementation, the discovery data ingestion module 404 receives discovery data for non-broadcast content from the content providers and links or otherwise associates this content with one or more virtual channel.

The discovery data ingestion module 404 can also receive and/or provide billing data 408 and advertising data, such as in an advertising catalog 410. Billing data 408, for example, may be used to process financial transactions through the discovery interface, such as a viewer purchasing media or ordering VOD content. Advertising data may be used to present advertisements through the discovery interface and potentially to tailor advertisements for individual viewers or families, in a similar manner as cookies for web sites. A media client 412 receives the discovery data from the one or more content compilations, billing data 408, and/or advertising data.

The metadata ingestion module 404, for example, can receive discovery data, such as metadata related to content provided (or to be provided) by a content provider. Metadata may include, without limitation, descriptive properties of content or descriptive properties of how the content is integrated within the unified discovery interface. Metadata describing media content, for example, may include title, synopsis, genre, category, classification, review, cast, crew, artist, producer, time, duration, location, content type, content provider, source, resolution, cost, subscriber, or other data relating to particular media content. Metadata describing integration within the discovery interface (e.g., a discovery interface relationship parameter) may include without limitation descriptions of the contextual, demographic, or parental ratings relationships of the content with other content. For example, contextual relationships may associate content directed to a common subject matter (e.g., World War II) or genre (e.g., "The 4400", "The X-files"). Demographic relationships may associate content directed to viewers in certain age groups (e.g., a viewer browsing through NICKELODEON® broadcast programming and/or Cartoon Network broadcast programming may see IP content directed to viewers in the 5-14 year old age group). Parental ratings relationships may prevent the display of IP content based on parental controls set up on the computing system.

The discovery data ingestion module 404 receives discovery data from one or more content providers 402 and aggregates the discovery data into one or more compilations of discovery data (such as a catalog, an index, a database, etc.). In one particular implementation, for example, the discovery data ingestion module 404 aggregates discovery data relating to broadcast content and non-broadcast content into a single compilation, such as a content catalog 406. Alternatively, the discovery data ingestion module 404 may aggregate discovery data relating to broadcast content and non-broadcast content into separate compilations, such as independent content catalogs or independent files or repositories stored within a single compilation (e.g., a catalog, index, database, etc.). The content catalog 406, for example, may include one or more repositories for metadata, such as depending on the type of content delivery by which particular content is available. In one implementation, the content catalog 406 may include a repository for broadcast content (e.g., time-based programming media content) metadata (e.g., an electronic programming guide), such as broadcast television, broadcast radio, cable television, cable audio, satellite television, satellite audio, or other broadcast content.

The content catalog 406 may further include a repository for non-broadcast content, such as Internet protocol content provided by a broadcast content provider or its sponsored or associated content providers. This "approved" Internet protocol content repository, for example, may include metadata for approved Internet protocol media content or Internet protocol media content provided by an approved or sponsor partner content provider. This repository, for example, may be downloaded or otherwise provided directly to a media client 412 (e.g., a user media content delivery device) to allow for quicker searching and response within unified discovery interface.

The media catalog may also include a "non-approved" Internet protocol repository. Such a non-approved repository, for example, may include metadata for media content accessible via a network (e.g., the Internet or another wide area network (WAN)). In this manner, the provider of a unified discovery interface may allow for access to a wide variety of content without being responsible for the quality or subject matter of the media content.

"Long tail" media content available, for example, on the Internet includes low circulation media content that, while not necessarily popular with the general public, may be especially relevant to interests of individual customers. In one particular implementation, for example, an end-user may provide a profile or other identifier of types of media content that are of interest and/or the unified discovery interface may predict media content that may be of interest based upon previous viewing of or listening to media content. In such an implementation, the unified discovery interface may provide a repository of suggested media content that may have been identified by sorting, searching, crawling, or otherwise analyzing of a larger repository based upon a particular user profile or prediction of user interest. In another implementation, a user may register with a third party provider to allow metadata for the third party's media content to appear in such a repository for use in a virtual channel of that user's personal unified discovery interface.

Such long tail media content may be available in enormous quantities and at various quality levels such that differentiation from media content provided by the provider or approved content providers of the unified discovery interface may be useful. However, metadata for such approved and non-approved Internet protocol media content may be combined into a single repository, or completely other repository arrangements may even be used. In addition, any repositories of discovery data may be downloaded or otherwise provided to the media client 412 or may be remotely accessible by the media client 412.

Other types of data, such as billing data 408 and an advertising catalog 410, may also be provided to or otherwise accessible by the media client 412 to authorize a purchase of media content where required or to provide advertisements for display within a unified discovery interface or during presentation of media content on a presentation device 414.

The media client 412 receives discovery data from the content catalog 406. As described above, the discovery data for non-broadcast content may already be linked or otherwise associated with one or more virtual channel, such as by the content providers 402 and/or at the discovery data ingestion module 404. In another implementation, the discovery data for non-broadcast content may be linked or otherwise associated with one or more virtual channel at the media client 412.

In one implementation, for example, a compilation of discovery data is received from the content catalog 406 at the media client 412 and one or more virtual channel is customized at the media client 412. A media client customization interface 428 is provided to allow customization of a virtual channel at the media client 412. The media client customization interface 428, for example, may be used by a third party, such as a user or a content provider, to update or provide new discovery data for non-broadcast content that may be presented in a virtual channel of a unified discovery interface. The user may, for example, program the media client 412, such as through local settings stored on the media client 412, via the media client customization interface 428 to select and associate certain media content with one or more virtual channels. In this manner, the user can identify non-broadcast content to be presented via a virtual channel in the unified discovery interface.

A third party, such as a content provider or OEM, may directly select or associate non-broadcast content with one or more virtual channels via the media client customization interface 428 (e.g., by updating or providing new discovery data, such as a discovery interface relationship parameter) to define one or more virtual channels to be presented via the unified discovery interface. The user or content provider may use the media client customization interface 428 at different times (e.g., periodically) in order to provide changing non-broadcast content available through the unified discovery interface.

In one implementation, for example, the media client 412 uses a subscription protocol, such as Really Simple Syndication (RSS), to periodically pull discovery data from a source external to the content catalog 406. In this implementation, a user or third party content provider can subscribe to content feeds outside of the media client discovery interface (e.g., through a web site) and have that feed appear in the discovery interface and be automatically updated. For example, a user may subscribe by navigating to a new Internet content provider (e.g., ROCKETBOOM® Internet content provider) or related web site that hosts family video content. The user can subscribe to the video content at the web site. The media client 412 then periodically polls the content source to determine if new content was available. When new content is available, the media client 412 provides that content to a user via a virtual channel in the discovery interface (e.g., the family channel). The user could define how content subscriptions are aggregated into particular virtual channels of the discovery interface. For example, the user can direct content from multiple sources into a single virtual channel or may opt to create separate virtual channels for each source.

A discovery interface manager 414 of the media client 412 uses this discovery data to generate and present a unified discovery interface to a user (e.g., via a presentation device 420). The unified discovery interface provides the user with a choice between broadcast content available via a broadcast channel and non-broadcast content available via a virtual channel. When a user selects particular media content from the unified discovery interface, a content manager 418 receives the content media and presents the content media to a media player 419 and then ultimately to the user on a presentation device 420. The content manager 418 may, for example, receive the media content from a personal media library 416 and/or content sources 422 and 424 associated with one or more of the content providers 402.

The content catalog 406 may, for example, contain metadata that defines an actual media content source, such as a unique identifier for that content, a source type (e.g., television or IP), and a method or protocol for accessing or retrieving the metadata (e.g., a tuning request for a live television program or an HTTP GET request and a URL to the content on an Internet server for IP content). When the user selects a particular media content via the discovery interface, the discovery interface manager accesses the metadata associated with the media content from the content catalog 406, such as using an ID reference and launches the appropriate content retrieval function based on its source type and access method. The content catalog 406 may also include metadata that allows the media client 412 to determine which promotional link is displayed (e.g., on a broadcast or other channel). For example, if a user selects the show Alias from channel 4, the content manager 418 directs an NTSC tuner to receive the Alias broadcast. Likewise, if the user selects the Lost episode from ABC.com, the content manager 418 establishes an appropriate video stream from the specified URL. If the user selects to purchase the episode of Lost from CinemaNow or Movielink, the content manager 418 initiates a download from the specified URL.

In one particular implementation, for example, the content compilation 406 includes a source field for each content entry. The source field may indicate a content delivery type (e.g., broadcast delivery or IP content delivery), which can be used to direct the content manager 418 to an appropriate source for the selected content. In addition, a promotional link to a promotional portal of the content provider can also be matched to the source field of the content compilation 406. For example, an ABC source field may be used to map ABC promotional links to ABC content. The discovery interface manager 414 of the media client 412 may also be used to determine which, if any, of the channels should receive a promotional link to a promotional portal. For example, the promotional link may only be used for the first affiliated channel in the discovery interface or only for the local affiliate, if multiple affiliates are included in the interface. In addition, the discovery interface manager 414 may also be used to block certain promotional links from appearing within the discovery interface, such as where promotion of content is blocked by a content provider.

The download manager, for example, may receive broadcast content via broadcast delivery methods, such as time-based programming content delivery, analog terrestrial broadcast content delivery, digital terrestrial broadcast content delivery, pay television broadcast content delivery, and the like. The download manager 418 may also receive non-broadcast content via non-broadcast delivery methods, such as Internet protocol content delivery, video-on-demand content delivery, digital video recorder content delivery, digital video disc content delivery, compact disc music content delivery, video cassette recorder content delivery, platform partner content delivery, web content delivery, longtail content delivery, and other types of remote non-broadcast media content delivery. Local media content, such as available via the personal media library 416, may also be included in a unified discovery interface.

As described above, a user can select particular broadcast content or non-broadcast content for presentation from the unified discovery interface. The download manager 418 residing on the media client 412 receives the selected media content and presents it on the presentation device 420 via a content player interface (not shown). The selected media content, for example, may be received from a remote content source 422 or 424. The remote content sources 422 and 424 may, for example, be associated with one or more content providers 402 or may be accessible from other content providers, such as longtail content providers accessible via the Internet or another WAN. Television or radio broadcast programming content, for example, may be received and selected via a tuner in the media client 412 from a broadcast media content source, a cable source, a satellite source, or other type of television or radio broadcast content delivery. Non-broadcast content, such as Internet protocol media content, may also be received from a server via a network, such as the Internet. Other types of media content delivery are also contemplated.

Figure 5:
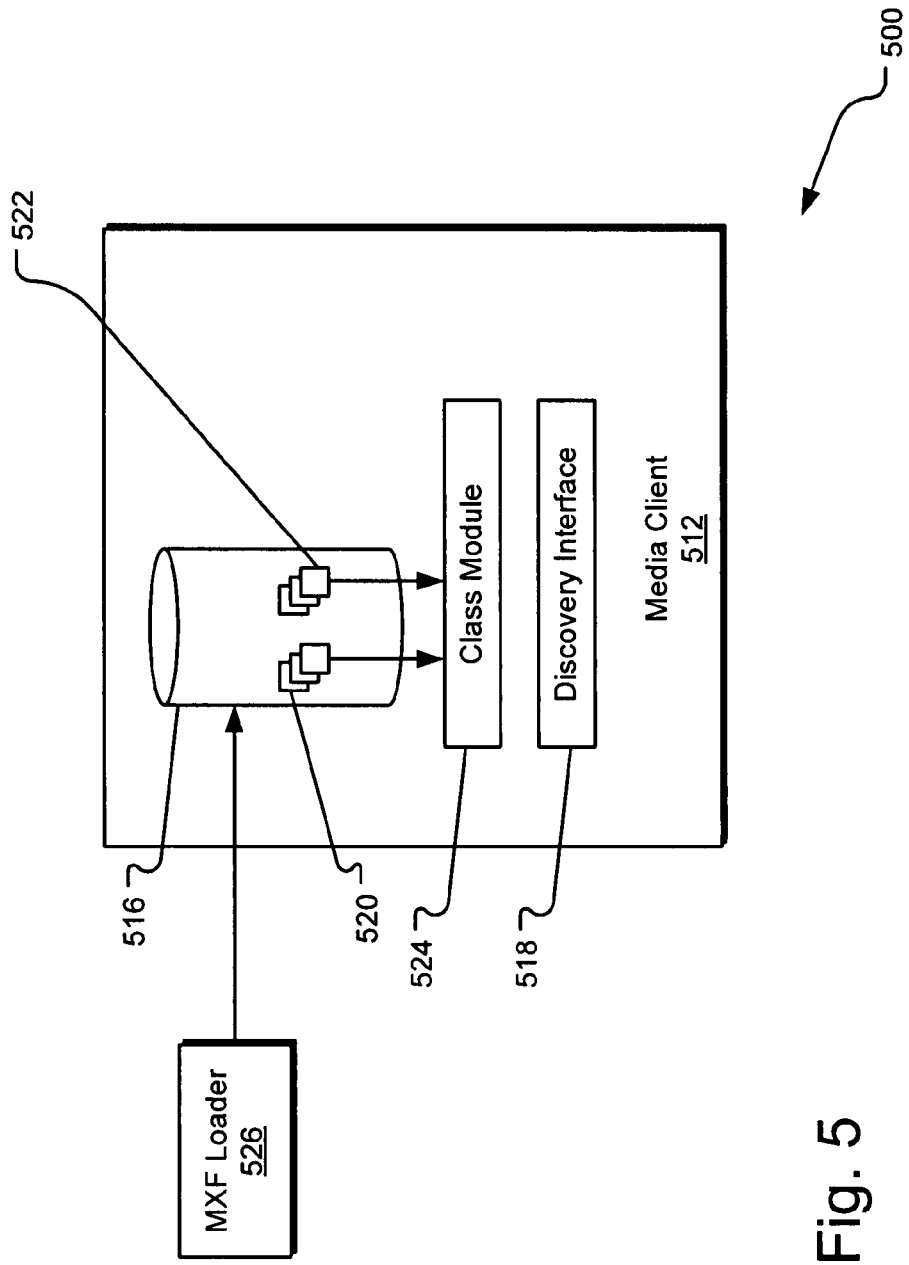
FIG. 5 illustrates another example implementation of a system for providing a unified discovery interface.

FIG. 5 shows an example implementation of a system 500 for providing a unified discovery interface. In this implementation, the system 500 includes a media client 512. The media client 512 includes local data storage, such as a hard drive, for storing a database 516 of discovery content for use in a unified discovery interface 518. The database 516 includes a broadcast discovery data repository 520 and a non-broadcast discovery data repository 522. The data repositories 520 and 522 can include, for example, separate file structures or tables within the database 516. The broadcast discovery data repository 520 includes discovery data related to broadcast content available via broadcast channels of the unified discovery interface 518 (e.g., broadcast television content). The non-broadcast discovery data repository 522 includes discovery data related to non-broadcast content available via virtual channels of the unified discovery interface 518 (e.g., IP content). In one particular implementation, for example, the repositories of the database 516 store discovery data in a material exchange format (MXF) file format. MXF is a "container" or "wrapper" format that supports a number of different streams of coded "essence," encoded with any variety of codecs, together with a metadata wrapper that describes the material contained within the MXF file. Other file formats for storing discovery data can also be used.

Table 1, shown below, shows one example of an MXF data structure. Other data structures may also be used.

TABLE 1

Example data structure for an MXF file.

```
<MXF version="1.0">
  <Assembly name="mcstore.dll" Version="6.0.5045.0">
    <nameSpace="Microsoft.MediaCenter.Store">
      <Type name="StoredObject"/>
      <Type name="Provider"/>
      <Type name="FieldRestriction"/>
      <Type name="UId" parentFieldName="target"/>
    </namespace>
  </Assembly>
  <Assembly name="mcepg.dll" Version="6.0.5045.0">
    <nameSpace="Microsoft.MediaCenter.Guide">
      <Type name="Serv"/>
      <Type name="TuneReq"/>
      <Type name="ATSCTuneRequest"/>
      <Type name="Channel"/>
      <Type name="ChannelLineup"/>
      <Type name="Program"/>
      <Type name="ScheduleEntry" groupName="ScheduleEntries"/>
    </namespace>
  </Assembly>
  <Provider id="WMIS">
    <UId nameSpace="Microsoft.MediaCenter.ProviderNames" idValue="WMIS"/>
  </Provider>
  <StoredObjects provider="WMIS">
    <TuneRequests>
      <ATSCTuneRequest id="tr4.1" phys="38" major="4" minor="1"/>
      <ATSCTuneRequest id="tr5.1" phys="48" major="5" minor="1"/>
      <ATSCTuneRequest id="tr7.1" phys="39" major="7" minor="1"/>
    </TuneRequests>
    <Services>
      <Serv id="KOMO-DT" name="KOMO-DT" callSign="KOMO-DT" affil="CBS" tuneReq="tr4.1"/>
      <Serv id="KING-DT" name="KING-DT" callSign="KING-DT" affil="NBC" tuneReq="tr5.1"/>
      <Serv id="KIRO-DT" name="KIRO-DT" callSign="KIRO-DT" affil="ABC" tuneReq="tr7.1"/>
    </Services>
    <ChannelLineup name="ATSC - 98052">
      <Channels>
        <Channel name="1041" service="KOMO-DT"/>
        <Channel name="1051" service="KING-DT"/>
        <Channel name="1071" service="KIRO-DT"/>
      </Channels>
    </ChannelLineup>
    <Services>
      <Serv id="KOMO-DT" name="KOMO-DT" callSign="KOMO-DT" affil="CBS" tuneReq="tr4.1"/>
      <Serv id="KING-DT" name="KING-DT" callSign="KING-DT" affil="NBC" tuneReq="tr5.1"/>
      <Serv id="KIRO-DT" name="KIRO-DT" callSign="KIRO-DT" affil="ABC" tuneReq="tr7.1"/>
    </Services>
    <Programs>
      <Program id="p1" title="Lost" episodeTitle="Weird Stuff Happens">
        <UId namespace="WMIS.ProgramIds" idValue="1234">
        <Description>
          example description.
        </Description>
      </Program>
    </Programs>
    <ScheduleEntries service="KOMO-DT">
      <ScheduleEntry program="p10"/>
      <ScheduleEntry program="p11"/>
    </ScheduleEntries>
    <ScheduleEntries service="KING-DT" >
      <ScheduleEntry program="p20" startTime="xxx" endTime="xxx"/>
      <ScheduleEntry program="p21" startTime="xxx" endTime="xxx"/>
    </ScheduleEntries>
    <ScheduleEntries service="KING-DT">
```

TABLE 1-continued

Example data structure for an MXF file.

```
      <ScheduleEntry program="p20" startTime="xxx" endTime="xxx"/>
      <ScheduleEntry program="p21" startTime="xxx" endTime="xxx"/>
    </ScheduleEntries>
    <ScheduleEntries service="KIRO-DT">
      <ScheduleEntry program="p30" startTime="xxx" endTime="xxx"/>
      <ScheduleEntry program="p31" startTime="xxx" endTime="xxx"/>
    </ScheduleEntries>
  </StoredObjects>
</MXF>
```

When the unified discovery interface 518 is accessed, discovery data from the broadcast discovery data repository 520 and the non-broadcast discovery data repository 522 is provided to a class module 524 that provides an abstraction layer, receives the discovery data from the repositories of the database 516 and combines them into broadcast channels and virtual channels for presentation in the unified discovery interface 518.

The class module 524 receives non-broadcast discovery data associated with a virtual channel from the non-broadcast discovery data repository 524 of the database 516 and determines how to combine it with the broadcast discovery data of a broadcast channel in the unified discovery interface 518. Where the virtual channel is associated with a broadcast channel, for example, the class module 524 receives a discovery interface relationship parameter associated with the virtual channel. As described above, the discovery interface relationship parameter indicates a broadcast channel of the discovery interface associated with that virtual channel. The class module 524 uses this discovery interface relationship parameter to identify the associated broadcast channel and determine a location for presenting the virtual channel within the unified discovery interface 516 in some relation to a location of the associated broadcast channel (e.g., above, below, alongside, or some other relation). Although the above implementation describes a virtual channel being associated with a broadcast channel, the virtual channel may also be associated with another virtual channel. Other implementations are also contemplated.

The discovery interface relationship parameter may specify, for example, a network or channel associated with the virtual channel, a title of an affiliate of a broadcast channel, programming metadata (e.g., layout and timing parameters), relationship parameters tying the virtual channel to a given entry of the unified discovery interface, or the like.

Where the virtual channel is not associated with a broadcast channel or another virtual channel, the class module 524 receives the discovery interface relationship parameter associated with the virtual channel. The class module 524 uses this discovery interface relationship parameter to determine a location (absolute or relative) for presenting the virtual channel within the unified discovery interface 516. Other implementations are also contemplated.

The discovery data stored in one or more of the repositories of the database 516 can be refreshed or otherwise updated at different times (e.g., periodically, at idle system times, or at other times). In one particular implementation, for example, the discovery data is refreshed via an MXF loader 526 that updates data in one or both of the broadcast discovery data repository 520 and the non-broadcast discovery data repository 522.

Figure 6:
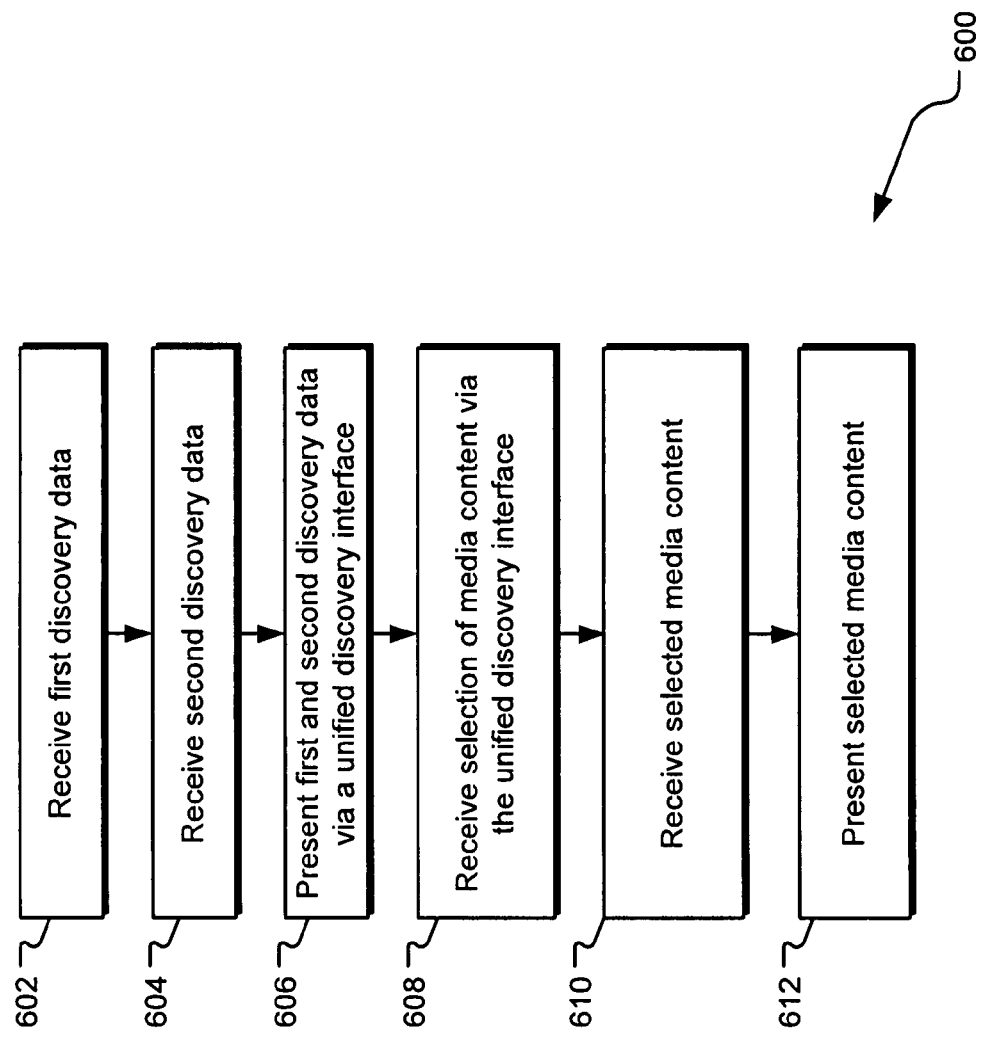
FIG. 6 illustrates example operations for providing non-broadcast content in a customized virtual channel of a unified discovery interface.

FIG. 6 illustrates example operations 500 for customizing a virtual channel in a unified discovery interface. First discovery data related to broadcast media content available via a broadcast channel of a unified discovery interface is received in a receipt operation 502. The discovery data may be received, for example, from a content provider for the broadcast media content, a content delivery provider (e.g., a broadcaster, cable provider, or satellite provider), a personal media library, or other sources of discovery data. The discovery data may include metadata, such as content-related metadata and metadata that describes integration of media content within the unified discovery interface. Metadata, for example, may include title, synopsis, genre, category, classification, review, cast, crew, artist, producer, time, duration, location, content type, content provider, source, resolution, cost, subscriber, or other data relating to particular media content.

Second discovery data related to non-broadcast media content available via a virtual channel of the unified discovery interface is received in another receipt operation 504. The first and second discovery data received in the receipt operations 502 and 504 may be received (directly or indirectly) from the same or from different content providers. The broadcast media content, for example, may include time-based programming, such as broadcast television, cable television, or satellite television, while the non-broadcast media content, for example, may include an alternative non-broadcast media content, such as video-on-demand, IP programming available via the Internet or another WAN, locally-stored media content, such as from a personal media library, and the like.

The virtual channel comprises a discovery interface relationship parameter indicating a relationship of the virtual channel within the unified discovery interface. The discovery interface relationship parameter, for example, may indicate a relationship of the virtual channel to another channel available via the unified discovery interface, such as a broadcast channel or another virtual channel. The discovery interface relationship parameter may alternatively indicate a location relationship of the virtual channel within the unified discovery interface, such as at a particular channel number or in relation to one or more other channels.

The first and second discovery data is presented via a unified discovery interface through which a user may select between the broadcast media content available via the broadcast channel and the non-broadcast content available via the virtual channel in a presentation operation 506. In one implementation, a client module presents the unified discovery interface to the user via a presentation device. The user can then review discovery data in the unified discovery device for media content available via both broadcast channels and virtual channels and select one or more media content for presentation from that interface.

A selection of broadcast media content available via the broadcast channel or the non-broadcast media content available via the virtual channel is received via the unified discovery interface in a selection operation 508. The selected media content is then received from a content source in a receipt operation 510 and is presented to a user via a presentation device in a presentation operation 512.

Figure 7:
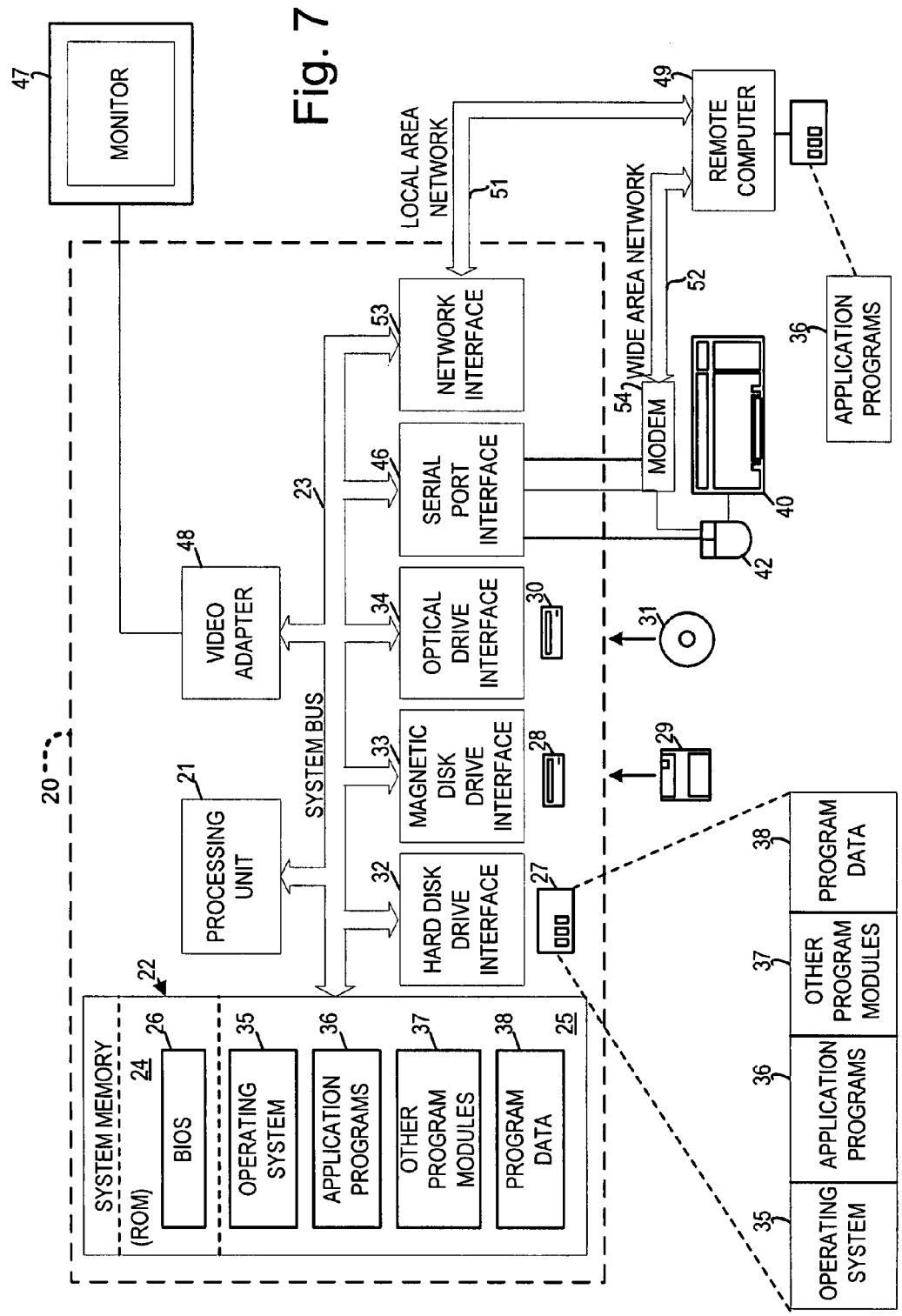
FIG. 7 illustrates an example system that may be useful in implementing the described technology.

The example hardware and operating environment of FIG. 7 for implementing the invention includes a computing device, such as general purpose computing device in the form of a gaming console or computer 20, a mobile telephone, a personal data assistant (PDA), a set top box, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a discovery data ingestion module, a download module, a discovery interface module, a class module, a discovery interface display module, and other modules may be embodied by instructions stored in memory 22 and/or storage devices 29 or 31 and processed by the processing unit 21. A personal media library, various catalogs, databases, content, images, animations, video, content metadata, and other data may be stored in memory 22 and/or storage devices 29 or 31 or other communicatively coupled storage as persistent datastores.

Figure 8:
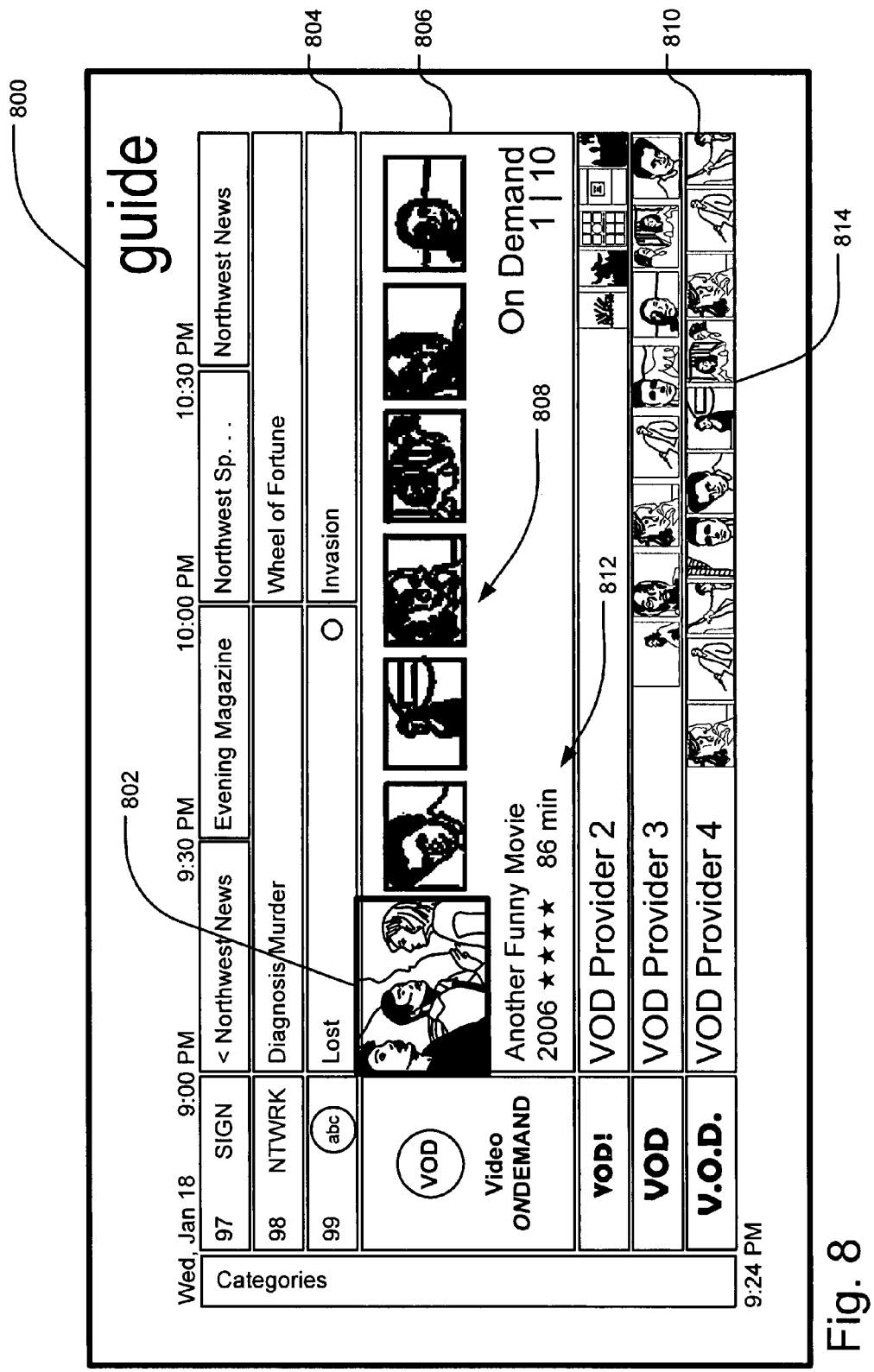
FIG. 8 illustrates an example screenshot of a discovery interface including an expanded graphical tile for an offering of available media content.

FIG. 8 illustrates an example screenshot of a discovery interface 800 including an expanded graphical tile 802 for an offering of available media content from a media application. Each row of the discovery interface displays information pertaining to one or more related offerings of media content (e.g., broadcast media content, such as broadcast network television content, and/or non broadcast media content, such as downloadable IP media content from a Web-based media provider). For example, row 804 depicts panels pertaining to broadcast media content offerings from a major television network. For certain broadcast offerings, the rows are divided into individual offerings which align with time slot columns. In contrast, row 806 depicts graphical tiles pertaining to video-on-demand ("VOD") programming (non-broadcast) that offers select media content. Typically, VOD programming is not tied to strict time slots. As such, the row 806 provides a strip of graphical tiles 808, inclusive of graphical tile 802, from which a user may select a specific media content offering.

The graphical images, animations, or video used in each tile are generated from discovery data retrieved for each offering. In one implementation, the graphical images, animations, or video (generally, "graphics") are selected from actual scenes in the media content, preferably with distinguishing characters or environments, to assist the user in rapidly recognizing the offering, although such graphics may be retrieved from separate graphics databases, including Web-based or local databases. It should be understood that the graphics may be associated with broadcast media content and non-broadcast media content, including content stored locally or via a network by the user (e.g., a tile that identifies a local digital photo album of the user and displays one or more images from the album as the tile graphics). The size of each tile is specified or constrained by dimension parameters associated with various states, including a focused state, an unfocused state, and an unfocused row state.

To select an offering, a user (or some automated process of the discovery interface or media application) navigates focus into an appropriate row. In the case of the illustrated display, the focus is moved to the graphical tile 802. As the focus is initially moved into the row 806, a discovery interface display module expands the height of the row from its unfocused height (see e.g., the height tiles in row 810) to zoom in on the graphical tiles in the graphical strip 808 and provide room for display of metadata associated with the offering of a focused graphical tile within the expanded row (e.g., an example discovery interface section). Upon detection of the focus on the graphical tile 802, the discovery interface display module further expands the height and width of the graphical tile 802 so that the tile 802 is taller and wider than other graphical tiles in the strip 808. In the illustrated implementation, the focused graphical tile 802 is also highlighted by an enhanced border to better distinguish it within the strip 808 and within the discovery interface 800.

Furthermore, upon detection of the focus on the graphical tile 802, metadata 812 retrieved from discovery data associated with the offering is displayed in proximity to the tile 802. This proximity, as well as other characteristics such as the overlap between the expanded tile 802 and the metadata region, suggests an association between the offering of the tile 802 and the metadata 812. In the illustration, the graphics of tile 802 depicts a scene from Another Funny Movie, including certain recognizable characters from the movie, and metadata identifying the movie name, year, duration, and rating is displayed below the tile 802.

It should also be noted that the unfocused row 810 also includes a graphical strip. In one implementation, to accentuate the focus on the focused graphical tile 802, the graphics in the graphical strip 814 of the unfocused row 810 (e.g., in an unfocused row state) are smaller than the graphical tiles of the graphical strip 808. The unfocused graphical tiles of the graphical strip 808 (e.g., in an unfocused state) are in turn smaller than the focused graphical tile 802 (e.g., in a focused state) of focused row 806. Again, these dimensions are specified or constrained by dimension parameters associated with each state.

FIG. 9 illustrates example operations 900 for displaying a discovery interface with an expanded graphical tile for an offering of available media content. A collection operation 902 collects discovery data for the available media content to be displayed in the discovery interface. In one implementation, the discovery data is periodically downloaded from a media content server or some other source.

A display operation 904 displays the discovery interface on a display device. A receiving operation 906 receives input for navigating focus within the discovery interface. In one implementation, the focus may be moved by a user using a keyboard, mouse or other pointing device, such as a trackball or remote control. Alternatively, the focus may be moved programmatically, such as via a search engine within the discovery interface.

A detection operation 908 detects input that moves the focus to a graphical tile. In response to such detection, an expansion operation 910 expands the height of the row in which the focused graphical tile is located, if it is not already expanded, and further expands the height and width of the focused graphical tile. A metadata operation 912 displays metadata associated with the content indicated by the focused graphical tile.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method in a computing system for displaying on a display device a discovery interface of a media application executing on the computing system, the method comprising:

displaying, on the display device, a unified discovery interface including a broadcast channel row for listing an offering of available broadcast television programming content for a given time slot and a virtual channel row associated with the broadcast channel row for listing offerings of available non-broadcast video-on demand programming content;

presenting the offerings of available non-broadcast video-on demand programming content as a plurality of graphical tiles within a the virtual channel row of the unified discovery interface, each graphical tile representing an offering of available non-broadcast video-on demand content related to the available broadcast television programming content and having at least one dimension parameter designated for an unfocused state of the graphical tile;

receiving input moving focus within the unified discovery interface;

detecting that the focus has been moved to the virtual channel row and to one of the graphical tiles within the virtual channel row;

altering display of the unified discovery interface such that at least one dimension of the focused graphical tile within the virtual channel row is displayed as expanded to exceed at least one corresponding dimension parameter designated for the unfocused state, responsive to the detecting.

2. The method of claim 1, wherein the unified discovery interface includes an electronic programming guide for accessing an offering of available non-broadcast video-on demand content represented by the focused graphical tile in response to receiving input selecting the focused graphical tile.

3. The method of claim 1, wherein the available non-broadcast video-on demand content associated with the focused graphical tile represents an offering of available non-broadcast video-on demand content related to a particular television show episode available at the given time slot.

4. The method of claim 1, further comprising:
collecting discovery data pertaining to the offerings of available non-broadcast video-on demand programming content, the discovery data specifying graphics associated with each of the offerings of available non-broadcast video-on demand programming content.

5. The method of claim 1, further comprising:
altering display of the unified discovery interface to expand both height and width of the focused graphical tile to exceed height and width parameters designated for the unfocused state.

6. The method of claim 1, further comprising:
altering display of the unified discovery interface to expand the focused graphical tile as expanded to exceed at least one dimension of all unfocused graphical tiles in the virtual channel row.

7. The method of claim 1, further comprising:
displaying a second virtual channel row within the unified discovery interface for listing additional offerings of available non-broadcast video-on demand programming content;
presenting the additional offerings of available non-broadcast video-on demand programming content as a second plurality of graphical tiles within the second virtual channel row.

8. The method of claim 7, wherein the virtual channel row that includes the focused graphical tile has focus and the second virtual channel row does not have focus, the method further comprising:
displaying, within the second virtual channel row, each graphical tile of the second plurality of graphical tiles the unfocused graphical tiles within the focused virtual channel row.

9. The method of claim 8, wherein the offerings of available non-broadcast video-on demand programming content listed within the focused virtual channel row and the second virtual channel row are provided by different video-on demand content providers.

10. The method of claim 1, further comprising:
collecting discovery data pertaining to the offerings of available non-broadcast video-on demand programming content, the discovery data specifying metadata associated with each of the offerings of available non-broadcast video-on demand programming content;
displaying metadata associated with the offering represented by the focused graphical tile in proximity to the focused graphical tile within the virtual channel row.

11. A computer-readable storage medium storing computer-executable instructions that, when executed, cause a computing system to perform a computer process that implements operations comprising:
displaying, for a media application, a unified discovery interface including a broadcast channel row for listing an offering of available broadcast television programming content for a given time slot and a virtual channel row associated with the broadcast channel row for listing offerings of available non-broadcast video-on demand programming content;
presenting the offerings of available non-broadcast video-on demand programming content as a plurality of graphical tiles within the virtual channel row of the unified discovery interface of the media application, each graphical tile representing an offering of available non-broadcast video-on demand content related to the available broadcast television programming content and having at least one dimension parameter designated for an unfocused state of the graphical tile;
receiving input moving focus within the unified discovery interface;
detecting that the focus has been moved to the virtual channel row and to one of the graphical tiles within the virtual channel row;
altering display of the unified discovery interface such that at least one dimension of the focused graphical tile within the virtual channel row is displayed as expanded to exceed at least one corresponding dimension parameter designated for the unfocused state, responsive to the detecting.

12. The computer-readable storage medium of claim 11, wherein the available non-broadcast video-on demand content associated with the focused graphical tile the represents an offering of available non-broadcast media content.

13. The computer-readable storage medium of claim 11, further comprising computer-executable instructions for:
collecting discovery data pertaining to the offerings of available non-broadcast video-on demand programming content, the discovery data specifying graphics associated with each of the offerings of available non-broadcast video-on demand programming content.

14. The computer-readable storage medium of claim 11, further comprising computer-executable instructions for:
altering display of the unified discovery interface to expand both height and width of the focused graphical tile to exceed height and width parameters designated for the unfocused state.

15. The computer-readable storage medium of claim 11, further comprising computer-executable instructions for:
altering display of the unified discovery interface to expand the focused graphical tile to exceed at least one dimension of all unfocused graphical tiles in the virtual channel row.

16. The computer-readable storage medium of claim 11, further comprising computer-executable instructions for:
displaying a second virtual channel row within the unified discovery interface for listing additional offerings of available non-broadcast video-on demand programming content;

presenting the additional offerings of available non-broadcast video-on demand programming content as a second plurality of graphical tiles within the second virtual channel row.

17. The computer-readable storage medium of claim 16, wherein the virtual channel row that includes the focused graphical tile has focus and the second virtual channel row does not have focus, the computer process further comprising:
    displaying, within the second virtual channel row, each graphical tile of the second plurality of graphical tiles the unfocused graphical tiles within the focused virtual channel row.

18. The computer-readable storage medium of claim 17, wherein the offerings of available non-broadcast video-on demand programming content listed within the focused virtual channel row and the second virtual channel row are provided by different video-on demand content providers.

19. The computer-readable storage medium of claim 11, further comprising computer-executable instructions for:
    collecting discovery data pertaining to the offerings of available non-broadcast video-on demand programming content, the discovery data specifying metadata associated with each of the offerings of available non-broadcast video-on demand programming content;
    displaying metadata associated with the offering represented by the focused graphical tile in proximity to the focused graphical tile within the virtual channel row.

20. A computing system for displaying on a display device a discovery interface of a media application executing on the computing system comprising:
    memory storing computer-executable instructions;
    one or more processors for executing said computer-executable instructions causing the computing system to perform a computer process comprising:
        displaying, on the display device, a unified discovery interface including a broadcast channel row for listing an offering of available broadcast television programming content for a given time slot and a virtual channel row associated with the broadcast channel row for listing offerings of available non-broadcast video-on demand programming content;
        presenting the offerings of available non-broadcast video-on demand programming content as a plurality of graphical tiles within the virtual channel row of the unified discovery interface of the media application, each graphical tile representing an offering of available non-broadcast video-on demand content related to the available broadcast television programming content and having at least one dimension parameter designated for an unfocused state of the graphical tile;
        receiving input moving focus within the unified discovery interface;
        detecting that the focus has been moved to the virtual channel row and to one of the graphical tiles within the virtual channel row;
        altering display of the unified discovery interface such that at least one dimension of the focused graphical tile within the virtual channel row is displayed as expanded to exceed at least one corresponding dimension parameter designated for the unfocused state, responsive to the detecting.

* * * * *

UNITED STATES PATENT AND TRADEMARK OFFICE
CERTIFICATE OF CORRECTION

PATENT NO. : 7,840,979 B2  
APPLICATION NO. : 11/821631  
DATED : November 23, 2010  
INVENTOR(S) : Daniel L. Poling, Jr. et al.

Page 1 of 1

It is certified that error appears in the above-identified patent and that said Letters Patent is hereby corrected as shown below:

In column 18, line 64, in Claim 1, after "within" delete "a".

In column 19, line 39, in Claim 6, after "tile" delete "as expanded".

In column 19, line 56, in Claim 8, after "tiles" insert -- smaller than --.

In column 20, line 40, in Claim 12, after "tile" delete "the".

In column 21, line 11, in Claim 17, after "tiles" insert -- smaller than --.

Signed and Sealed this
Twenty-sixth Day of July, 2011

David J. Kappos
*Director of the United States Patent and Trademark Office*